US010548432B1

(12) United States Patent
Pugh

(10) Patent No.: US 10,548,432 B1
(45) Date of Patent: Feb. 4, 2020

(54) WATER BAGEL COOKWARE AND METHOD

(71) Applicant: Charles Vernon Pugh, Longmont, CO (US)

(72) Inventor: Charles Vernon Pugh, Longmont, CO (US)

( * ) Notice: Subject to any disclaimer, the term of this patent is extended or adjusted under 35 U.S.C. 154(b) by 0 days.

(21) Appl. No.: 16/536,030

(22) Filed: Aug. 8, 2019

Related U.S. Application Data

(63) Continuation-in-part of application No. 16/394,288, filed on Apr. 25, 2019, now Pat. No. 10,420,442.

(51) Int. Cl.
*A47J 36/20* (2006.01)
*A47J 45/10* (2006.01)
*A21B 5/00* (2006.01)
*A47J 36/02* (2006.01)
*A21D 13/40* (2017.01)
(Continued)

(52) U.S. Cl.
CPC ................. *A47J 36/20* (2013.01); *A21B 5/00* (2013.01); *A21C 14/00* (2013.01); *A21D 13/40* (2017.01); *A47J 36/025* (2013.01); *A47J 37/01* (2013.01); *A47J 37/108* (2013.01); *A47J 45/07* (2013.01); *A47J 45/10* (2013.01)

(58) Field of Classification Search
CPC .......... A47J 36/20; A47J 36/025; A47J 36/16; A47J 36/18; A47J 36/22; A47J 36/24; A47J 36/2405; A47J 36/2411; A47J 37/108; A47J 45/06; A47J 45/065; A47J 45/066; A47J 45/063; A47J 45/07; A47J 45/071; A47J 45/074; A47J 45/075; A47J 45/077; A47J 45/10; A47J 47/14; A47J 47/16; A47J 47/20; A47J 2400/08; A47G 239/00; A47G 43/20; A21C 14/00; A21D 43/40; Y10T 403/7007; A47B 75/00; A47F 7/0071; A21B 5/00
USPC ...... 211/85.4, 125, 126.1; 99/448, 354, 426, 99/442; 16/422; 220/318, 319; 403/349
See application file for complete search history.

(56) References Cited

U.S. PATENT DOCUMENTS 536,986 A * 4/1895 Dunlap ................ A47J 37/047 99/409
745,196 A * 11/1903 King et al. ............. A47J 29/06 99/440
(Continued)

*Primary Examiner* — Jennifer E. Novosad
(74) *Attorney, Agent, or Firm* — Patent Law Offices of Rick Martin, P.C.

(57) ABSTRACT

A bagel cookware comprises a round bagel tray sized to hold about four bagels in a twelve-inch pot of boiling water. The bagel tray has about four vertical bagel support rods and a central socket comprising a cylindrical collar. This cylindrical collar has a pair of vertical slots to receive a T bar end of a lifting handle. When the handle is twisted the T bar end engages a pair of retainer channels. The handle also has a series of anti-floatation screens so the bagels cannot float while boiling. The chef can use the removable handle to place the cookware in boiling water, then pick up the cookware and place it in an oven. Commercial embodiments could use robotics and hold dozens of bagels on an equivalent apparatus. Alternative embodiments include a stamped anti-flotation screen, a hollow handle rod fitting over the central socket, and the T bar engaged through the central socket. The hollow handle rod embodiment allows a controlled tilting of the entire bagel cookware during the phases of cooking.

20 Claims, 12 Drawing Sheets

(51) Int. Cl.

| | |
|---|---|
| ***A47J 37/01*** | (2006.01) |
| ***A47J 45/07*** | (2006.01) |
| ***A47J 37/10*** | (2006.01) |
| ***A21C 14/00*** | (2006.01) |

(56) References Cited

U.S. PATENT DOCUMENTS 820,792 A * 5/1906 Kelly .................. A47J 37/1295 99/442
1,205,522 A * 11/1916 Doerr et al. ............. A21B 3/13 99/442
1,548,242 A * 8/1925 Anderson ............... A47J 29/06 99/440
1,565,077 A * 12/1925 Finn .................... A47J 37/0694 99/442
1,630,188 A * 5/1927 Knauff ................ A47J 37/0694 99/419
2,362,921 A * 11/1944 Palensky .................. A21B 5/00 99/419
2,576,235 A * 11/1951 Nelson .................... A47J 45/10 294/33
2,655,403 A * 10/1953 Ernest ..................... A47J 45/10 294/33
3,143,059 A * 8/1964 Sofio ....................... A47J 27/04 99/440
3,379,118 A * 4/1968 Perez .................. A47J 37/0694 99/419
3,423,781 A * 1/1969 Henson ................... A47L 13/24 15/145
3,638,583 A * 2/1972 Goodier ................. A21B 3/132 249/122
3,897,162 A * 7/1975 Havark ................... F16B 19/08 403/353
3,933,011 A * 1/1976 DiGilio ............. A44C 17/0208 63/29.1
4,138,939 A * 2/1979 Feld ........................ A47J 43/24 99/418
4,223,862 A * 9/1980 Doughty .................. A61B 6/04 248/222.52
4,656,928 A * 4/1987 Mack ...................... A47J 29/00 426/302
4,853,509 A * 8/1989 Murakami ............ A47J 36/027 219/731
4,943,182 A * 7/1990 Hoblingre ................. F16B 7/20 403/325
5,129,451 A * 7/1992 Moir ....................... A47J 37/00 165/185
5,346,268 A * 9/1994 Baker ................. A47J 37/0786 294/103.1
5,456,095 A * 10/1995 Tawil ................. A44C 17/0216 24/574.1
5,682,809 A * 11/1997 Harrison .................. A21B 5/08 219/474
5,685,217 A * 11/1997 Kreitzer ................ A47J 36/027 219/725
5,720,081 A * 2/1998 Aquilina .................. B25G 1/00 16/422
5,934,185 A * 8/1999 Sonnier ................... A47J 36/20 211/181.1
6,065,393 A * 5/2000 Lombard ................ A47J 29/00 99/426
6,126,359 A * 10/2000 Dittrich .................. A61B 17/29 403/325
6,438,784 B1 * 8/2002 Yu ........................... A46B 7/04 15/105
D479,414 S * 9/2003 Sparkowski ................... D9/456
6,742,446 B2 * 6/2004 McLemore ......... A47J 37/1295 99/416
6,823,563 B2 * 11/2004 Robinson .............. E05B 35/008 16/422
7,147,399 B2 * 12/2006 Viscount .............. A63C 19/062 403/349
7,213,292 B1 * 5/2007 Tucker ..................... B25G 1/02 15/144.1
7,237,476 B1 * 7/2007 Bourgeois ............... A47J 36/26 99/340
7,984,528 B2 * 7/2011 Giacolo ................... B25G 3/08 15/145
8,245,632 B1 * 8/2012 Fields ..................... A47J 29/02 99/440
D680,352 S * 4/2013 Aiudi .......................... D6/682.4
8,540,198 B2 * 9/2013 Keyvanloo ........... A47F 5/0823 248/220.21
8,851,540 B1 * 10/2014 Gaulke ............... A47J 37/0664 294/12
8,915,391 B2 * 12/2014 Radow ................... A47G 19/00 108/139
9,156,140 B2 * 10/2015 Stillwagon ................ B25B 9/00
10,420,441 B1 * 9/2019 Pugh ....................... A47J 36/20
2001/0002521 A1 * 6/2001 Maniezzo ............. A47F 5/0823 52/27
2006/0254431 A1 * 11/2006 Mariano ................. A47J 36/20 99/415
2006/0254976 A1 * 11/2006 Cooper ................... A47J 36/20 210/470
2007/0092333 A1 * 4/2007 Viscount .............. A63C 19/062 403/349
2009/0208281 A1 * 8/2009 Noh ...................... B60T 11/046 403/349
2013/0111707 A1 * 5/2013 Mowry ................... A47J 45/10 16/422
2016/0135818 A1 * 5/2016 Weekes .............. A61B 17/1666 606/80
2016/0331184 A1 * 11/2016 Picken, Sr. ............. A47J 45/10

* cited by examiner

Fig. 9
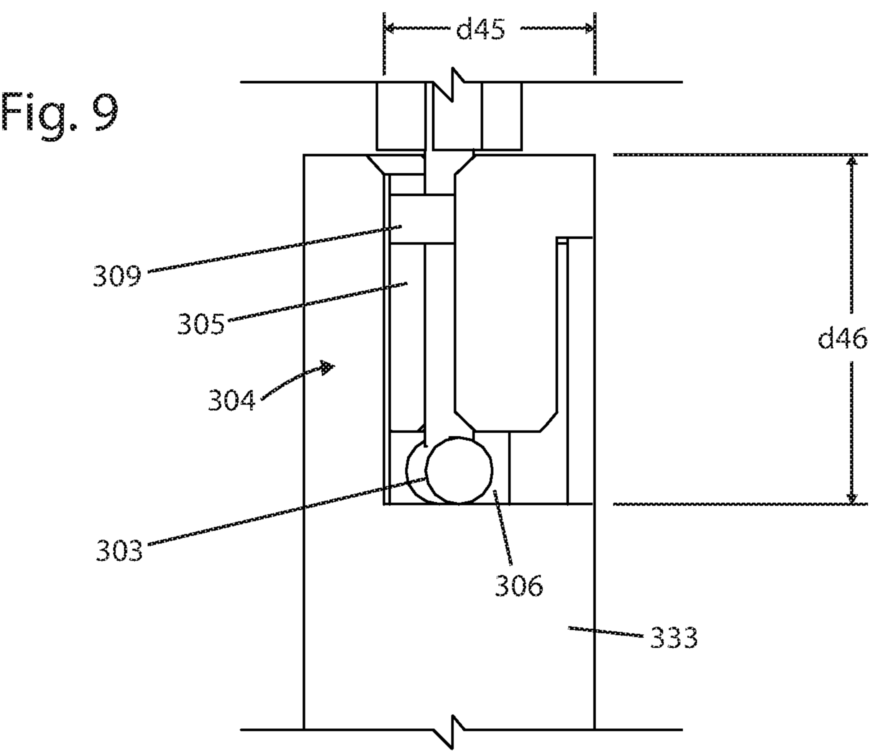
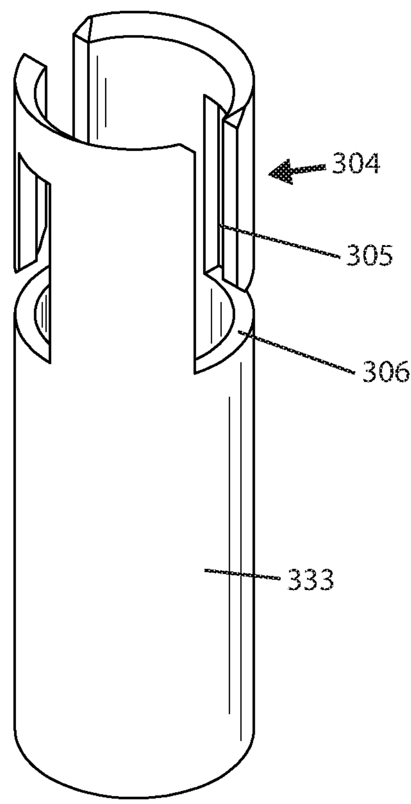
Fig. 10

WATER BAGEL COOKWARE AND METHOD

CROSS RELATED PATENTS

This is a Continuation of U.S. patent application Ser. No. 16/394,288 filed Apr. 25, 2019, which was a Continuation In Part of U.S. patent application Ser. No. 16/127,537 filed Sep. 11, 2018.

FIELD OF INVENTION

The present invention relates to first boiling a donut shaped bagel and then baking it using the same cookware.

BACKGROUND OF THE INVENTION

Traditional water bagel methods include using a cookie tray with paper parchment, a pot of boiling water, a strainer spoon and an oven. First the chef makes a round raw bagel dough. Second the chef places several raw bagel doughs onto a cookie tray with a non-stick disposable such as paper parchment. Third the dough rises. Fourth the raw dough bagels are dropped into simmering hot water. Optionally several additives can be added such as baking soda or lye. Fifth each bagel is flipped in a time range of about ten seconds to about thirty seconds. That is tricky because the chef must try and keep track of each of perhaps four bagels and how much time has each bagel been in the water. Sixth a strainer spoon is used to remove each bagel. Seventh the bagels are placed on a non-stick pan. Optionally a topping may be added. Eighth the bagels are baked at about 400° F. for a chosen time. Ninth the pan is removed from the oven. Now the bagels are ready to eat.

What is needed in the art is cookware to hold (four) several bagels together during the hot water and baking process to save handling time and solve the problem of uniform boiling and flipping time. The present invention solves these problems with a (stainless steel) two-piece cookware. A bottom (circular) tray has poles to place the bagels around. A top handle and anti-float screen are used to place the bagels into the water, out of the water, into the oven and out of the oven.

SUMMARY OF THE INVENTION

The main aspect of the present invention is to provide a multi-bagel pan that has poles to keep the bagels in place during boiling.

Another aspect of the present invention is to provide a handle having an anti-flotation screen for the pan.

Another aspect of the present invention is to allow the handle to be used both for boiling and placing trays into and out of the oven for baking.

Another aspect of the present invention is to provide a removable handle to allow loading/unloading of the bagels.

Another aspect of the present invention is to provide a Teflon® coated stainless steel structure for all the cookware.

Another aspect of the present invention is to provide the handle with a base means functioning to stabilize the pan during tilting.

Other aspects of this invention will appear from the following description and appended claims, reference being made to the accompanying drawings forming a part of this specification wherein like reference characters designate corresponding parts in the several views.

The basic cookware features are noted below.

| FEATURE | CRITERIA |
|---|---|
| 1. Description | 1. Baking tray for bagels<br>2. Removable handle<br>3. Four hollow posts for bagels to wrap around |
| 2. Requirements | 1. Tray must be able to fit into 12" diameter pot<br>2. Tray needs to be small enough to not create pressure when dipped into the pot<br>3. Non-stick pan<br>4. Removable stainless steel handle<br>5. Pan will accommodate for bagel expansion |
| 3. Design | 1. Non-stick pan with 4 hollow posts |

The design consists of a nonstick pan with four bagel posts and a detachable stainless-steel handle. The pan is sized to accommodate for the bagel expansion, but also fit easily into the dipping pot without creating too much upwards water pressure. The handle is made from a bent rod and can have two rings welded on to hold the bagels down while under water. The diameter of the tray is about 11.5" to accommodate for the 12" pot. All materials are preferably Teflon® coated stainless steel.

BRIEF DESCRIPTION OF THE DRAWINGS

FIG. 9 is a side elevation view of the center port and "L" slot.

FIG. 10 is a top perspective view of the center post.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
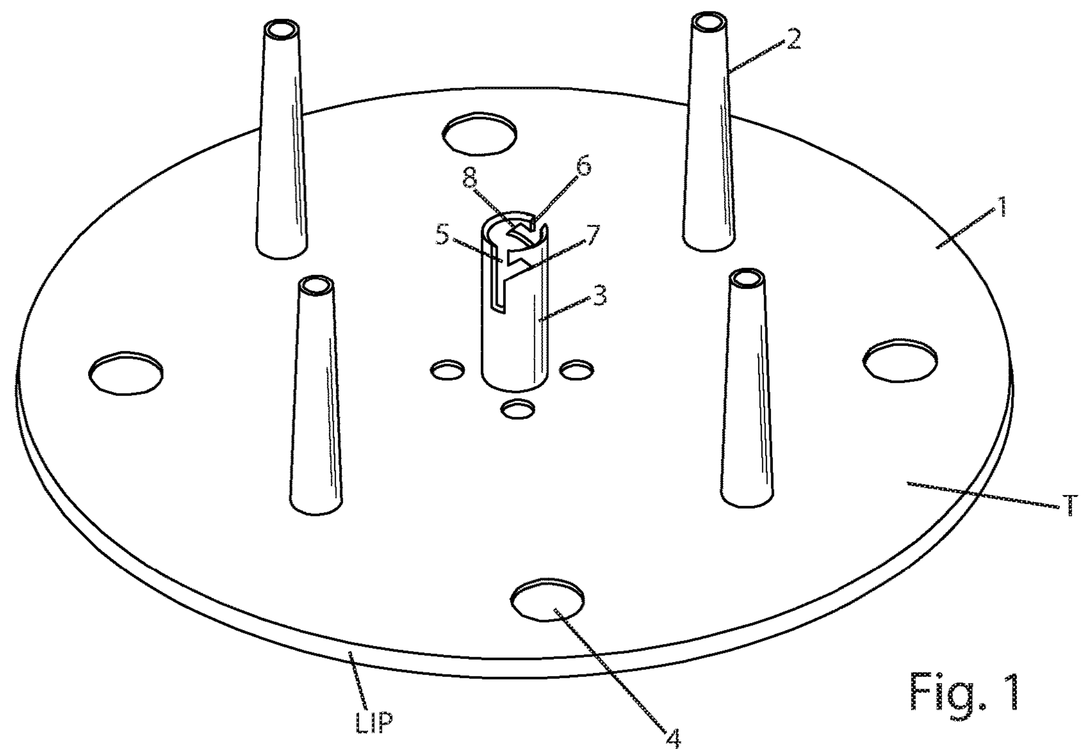
FIG. 1 is a top perspective view of the bagel pan.
Figure 2:
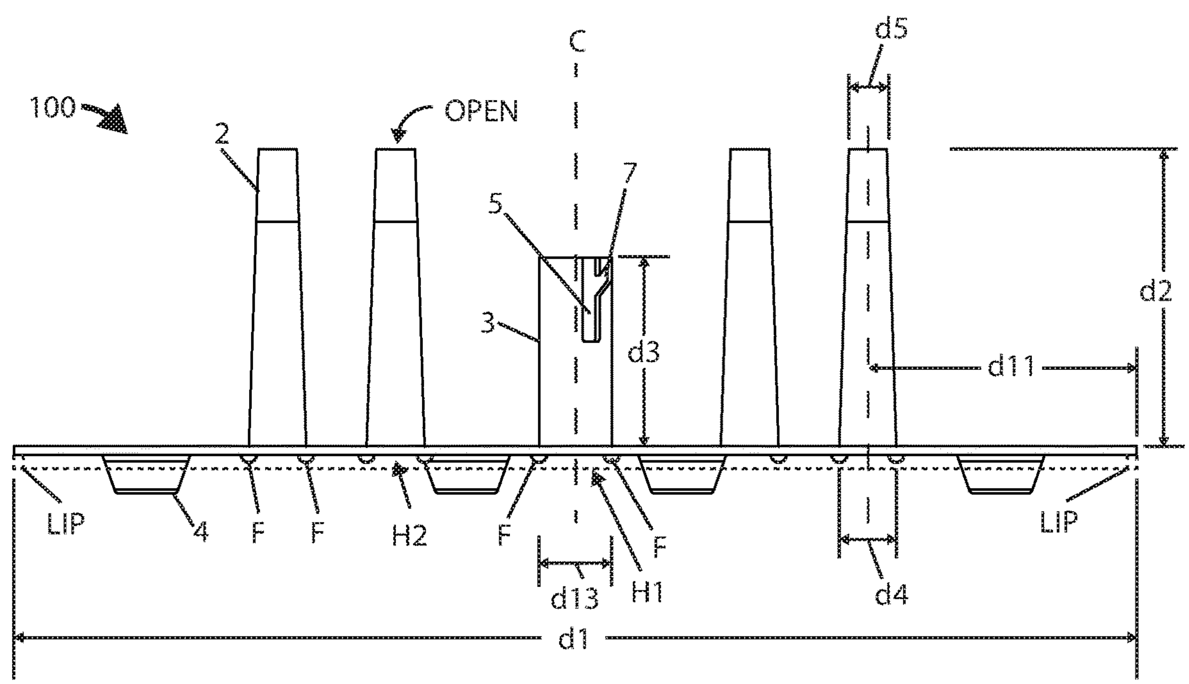
FIG. 2 is a side elevation view of the bagel pan.

Referring first to FIGS. 1,2 the bagel tray 1 (nominally thinner than 0.125 inch for weight and stamped with a rolled peripheral lip LIP) is preferably round to fit in a twelve-inch pot of water. The tray 1 could be made from aluminum, SS, coated mild steel, copper or the like. Each bagel post 2 (preferably hollow) is identical and placed a distance d11 from a center of post to the peripheral edge of the bagel tray 1. The top is OPEN, with a water exit hole H2 at each bottom.

The bagel tray 1 has a central axis C. The posts 2 and the top tray 1 are preferably Teflon® coated, or an equivalent anti-stick compound. Mounted on the central axis C is a socket 3. A hole H1 allows water to exit the socket 3. The socket 3 has parallel vertical slots 5,6 which at the upper end diverge into retainer channels 7,8. A plurality of feet 4 keep the bagel tray 1 off the bottom of the pot while boiling. The entire tray 1 is preferably stainless steel with all upper surfaces of the posts and tray Teflon® coated as noted with a "T" marking. Preferably the socket 3 and the bagel posts 2 will fit thru holes H1, H2 and be tack welded at the bottom via the flange F at the bottom of each socket 3 and bagel post 2.

Figure 3:
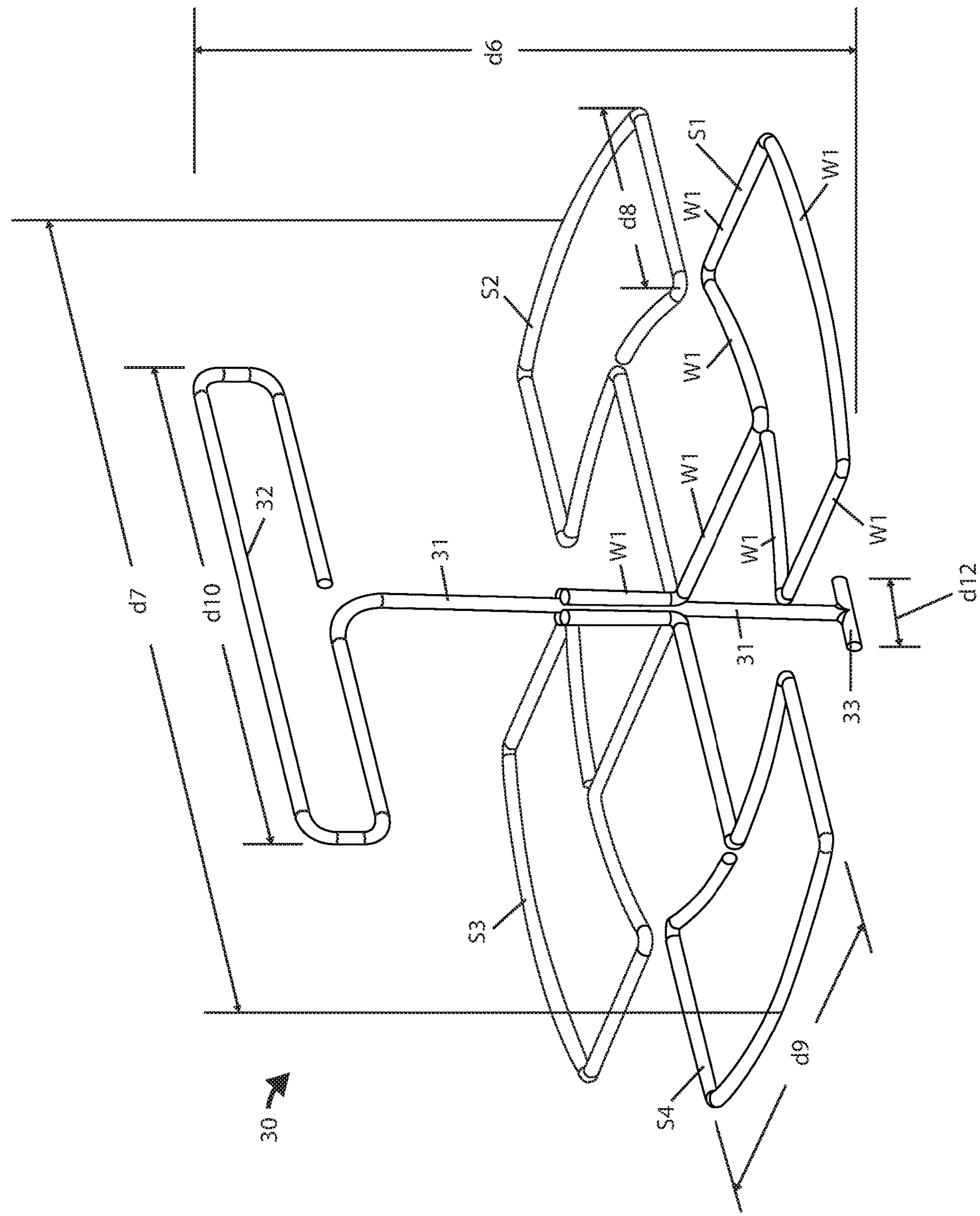
FIG. 3 is a side perspective view of the handle.

Referring next to FIG. 3 the handle 30 is preferably one-piece stainless-steel Teflon® coated. The wire structure is preferably about one eighth inch in diameter. Not shown is an optional telescoping rod 31 to which the gripper 32 is connected to. The rod 31 ends in a T bar 33. This T bar 33 slides down the parallel vertical slots 5,6 of socket 3. When the T bar 33 is twisted left, it engages the retainer channels 7, 8 so that the bagel tray 1 can be lifted up.

The screen segments S1, S2, S3, S4 are preferably each made of a wire bent into shape as shown by wire W1 forming screen segment S1. Welds can hold the vertical ends of the screen segments against rod 31.

Figure 4:
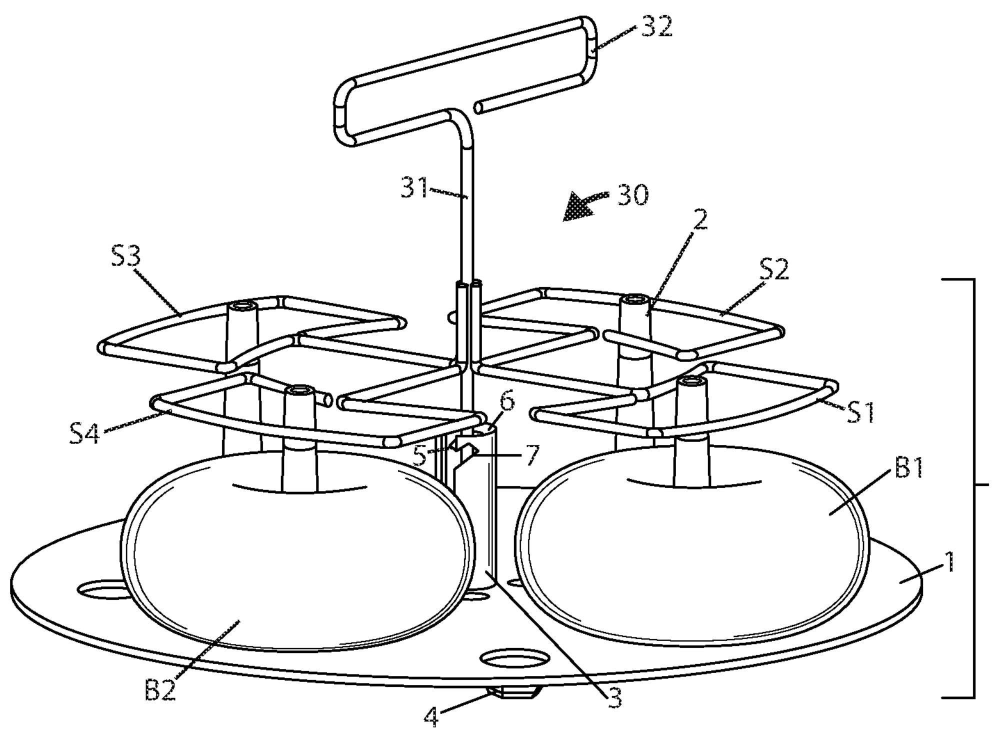
FIG. 4 is a side perspective view of the handle and pan cookware with two bagels onboard.
Figure 5:
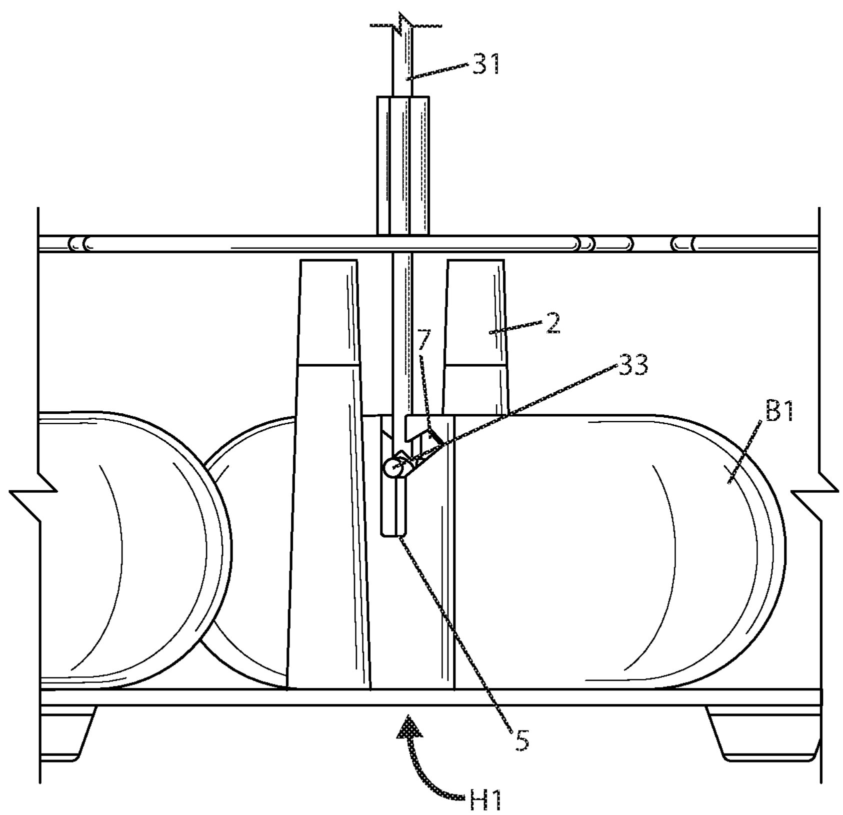
FIG. 5 is a side closeup view of the handle in the detach mode.

Referring next to FIGS. 4,5 the handle 30 is attached to the bagel tray 1 via the T bar 33 engaging vertical slots 5,6. Bagels B1, B2 are resting atop bagel tray 1.

When the chef lets go of the gripper 32, the T bar 33 falls to the bottom of vertical slots 5,6. In this rest mode the cookware designated CW could be resting on a table or resting in a pot of hot water or resting in an oven at oven 400° F. The handle 30 is removed from the bagel tray 1 for loading raw dough bagels and unloading cooked bagels.

Figure 6:
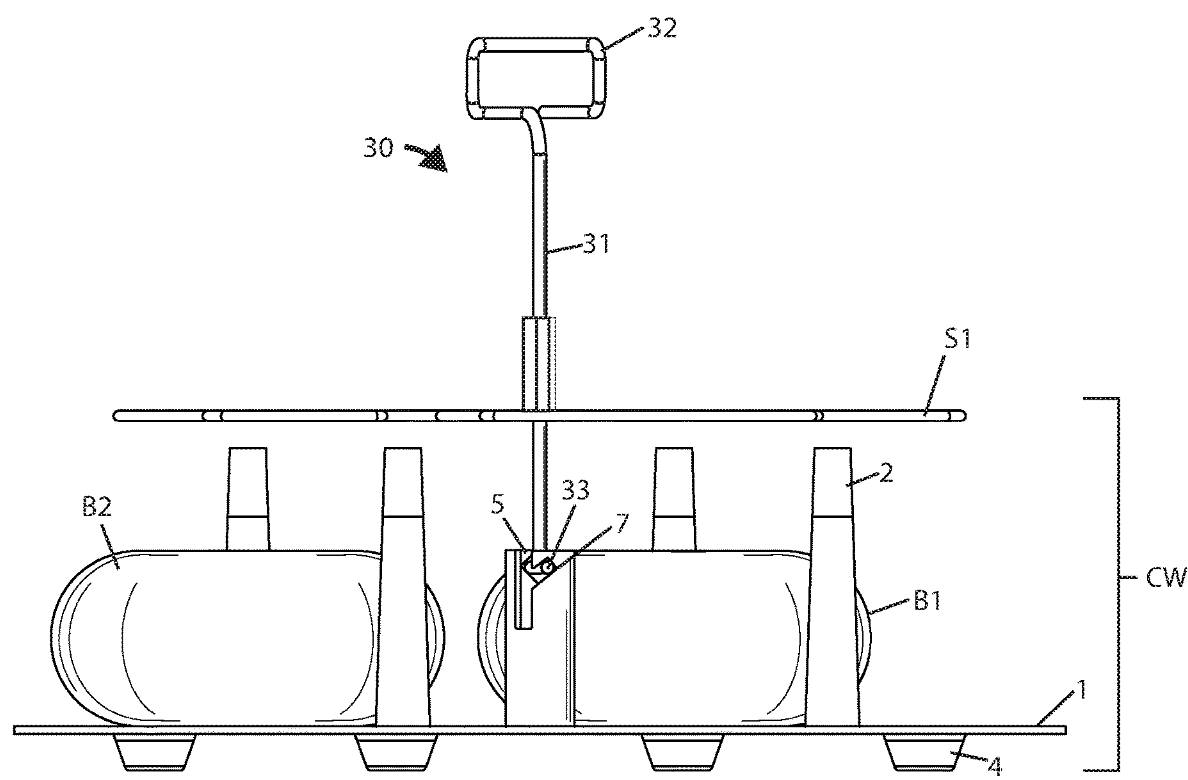
FIG. 6 is a side elevation view of the handle in the lift mode.

In FIG. 6 the gripper 32 has been partially rotated counterclockwise to engage the T bar 33 in retainer channels 7,8. In this locked mode the cookware CW can be lifted and placed where needed.

Nominal dimensions are d1=11.5", d2=3.0", d3=1.5-2.0", d4=0.50", d5=0.25", d6=4.5625", d7=9.10", d8=2", d9=3.875", d10=5.425", d11=1.5", d12=1.0", d13=0.615".

The preferred method of using cookware CW is noted below.

Steps:

1. Place raw dough rings oven four rods 2 on the circular bagel tray1;
2. Insert handle 30 T bar 33 into socket 3;
3. Twist handle 30 to engage T bar 33 into the retainer channels 7,8;
4. Lift the total assembly CW using gripper 32 and dunk into boiling fluid (water, oil), and chef chooses duration and quantity of water bathing (repeat step 4 with each batch);
5. Adjust oven rack to allow insertion of assembly CW to accommodate height of d6 plus the chef's hand;
6. Pre-heat oven (to about 400° F.) (optionally add topping)
7. Place assembly CW in oven and optionally remove handle 30;
8. Bake a chosen time;
9. Place (cold) handle 30 back into socket 3 and remove baked bagels.
10. Remove handle 30 from socket 3.
11. Remove bagels from bagel tray 1.
12. Eat!

Figure 7:
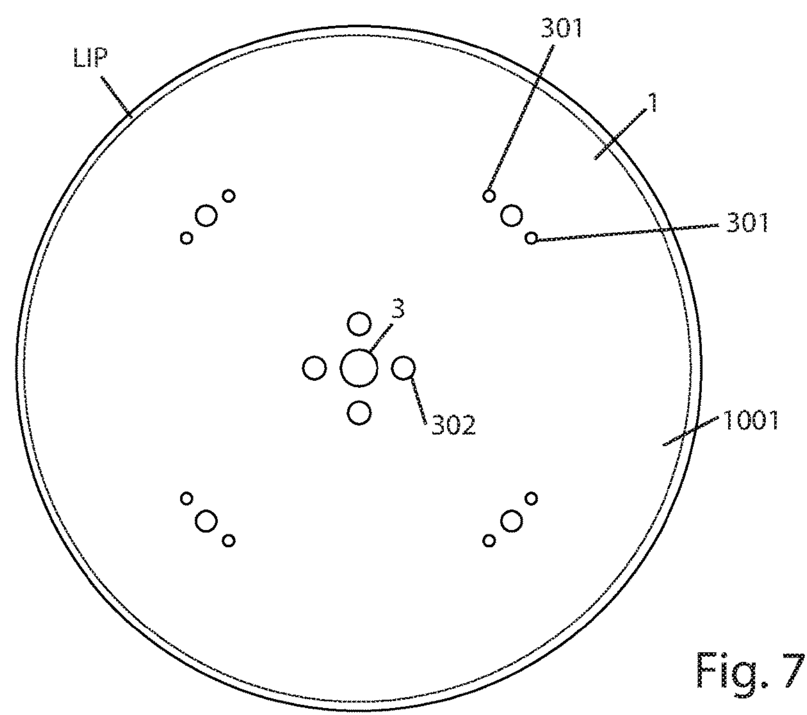
FIG. 7 is a bottom plan view of tray 1.
Figure 8:
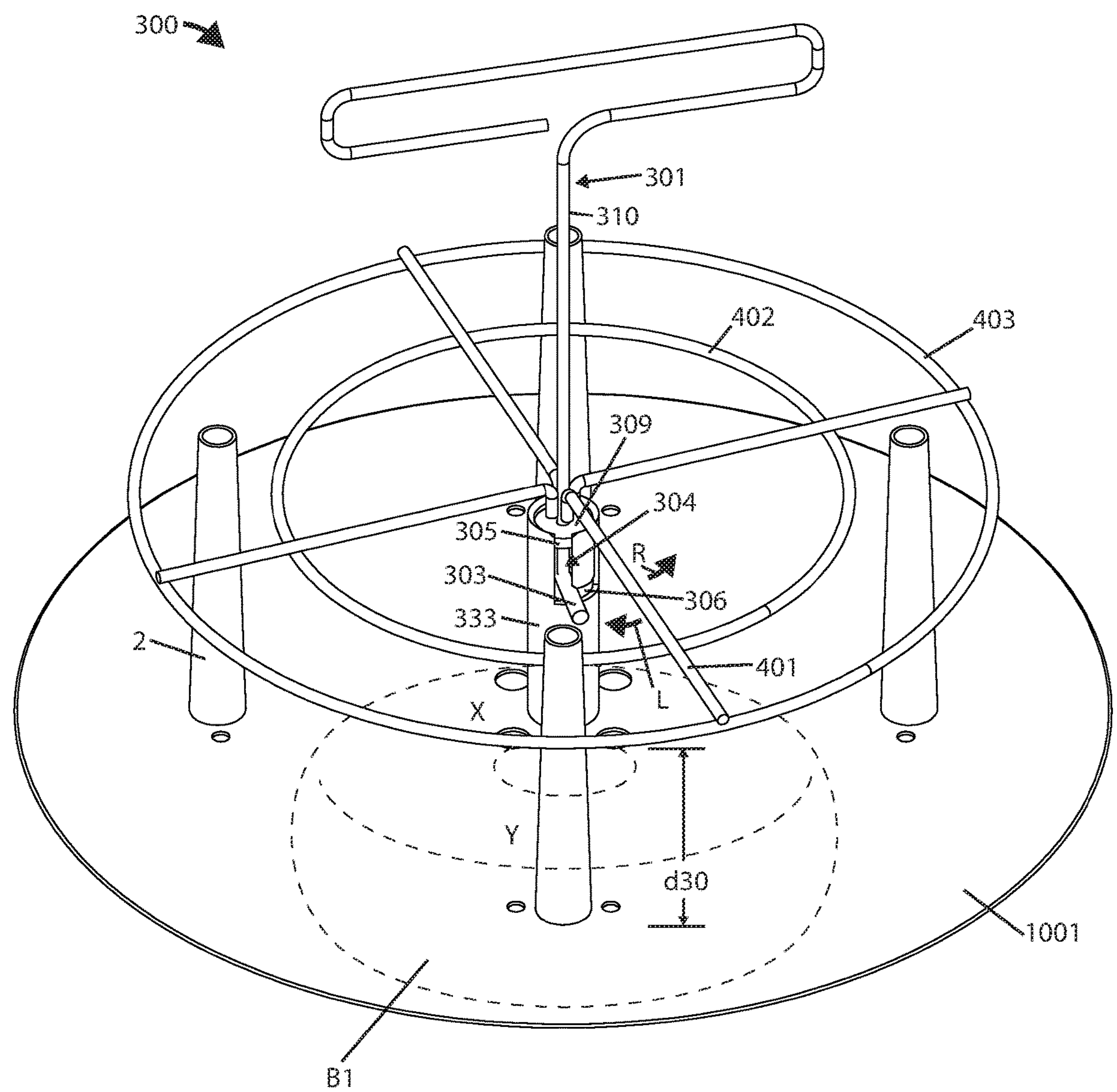
FIG. 8 is a top perspective view of an alternate cookware 300.
Figure 11:
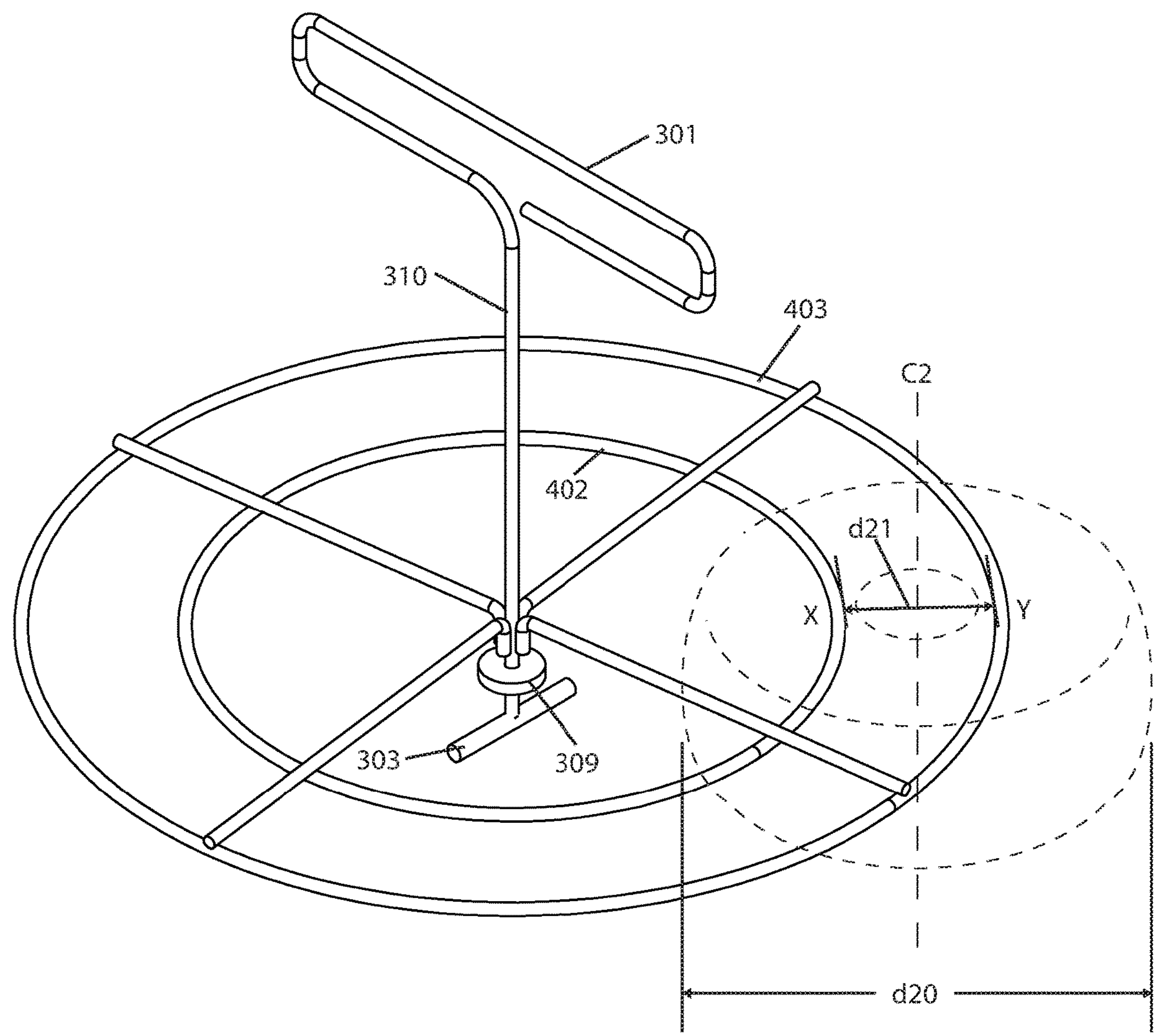
FIG. 11 is a top perspective view of an alternate handle 301.

In FIG. 7 the bottom of tray 1001 shows water drain holes 301 for each post 2 to allow the center of each bagel to drain out the water when lifting. The hollow bottom of each post 2 fits into a hole tightly, and a tack weld may be used.

The socket 333 (also called a center post) is also hollow and fits tightly into its hole. A tack weld may be used. Water drain holes 302 allow easy drainage and lifting. This tray 1001 has no feet, and the bottom is not Teflon® coated.

Referring next to FIGS. 8,9,10,11 the cookware combination of the tray 1001 and handle 301 is designated 300. The center post 333 has an L shaped symmetrical slot 304 for the T shaped arm 303 at the bottom of the handle 301. In operation the arm 303 is placed down the vertical slot (s) 305 of L slot 304. Then the handle 301 is rotated to insert arm 303 into the horizontal slot 306 of the L slot 304. In this engaged position the handle 301 can lift the tray 1001 as well as allow an up and down dunking of the tray 1001 in a pot of water. The washer (metal) 309 prevents the shaft 310 of handle 301 from wobbling in center post 333 during handling.

Arrows left L and R show the rotational movement of the radius arm 401. The design must prevent arm 401 (*s*) from hitting post (s) 2, which extend above the arm 401 about one half inch. Inner ring 402 should be designed to align with a center of the inner ring denoted X of bagel B, and outer ring 403 should be designed to align with a center of the outer ring denoted Y of bagel B in order to prevent wobbling of the bagel as it tries to float underwater in the pot. The height of each post 2 is about 3.0 to 3.5 inches with the height of the rings 402, 403 above the tray 1001 in the engaged position shown is about 3.0 inches (d30). The nominal diameter of ring 402 is about 6.0 inches. The nominal diameter of ring 403 is about 9.0 inches. The central axis of the post 2 is C2.

Figure 12:
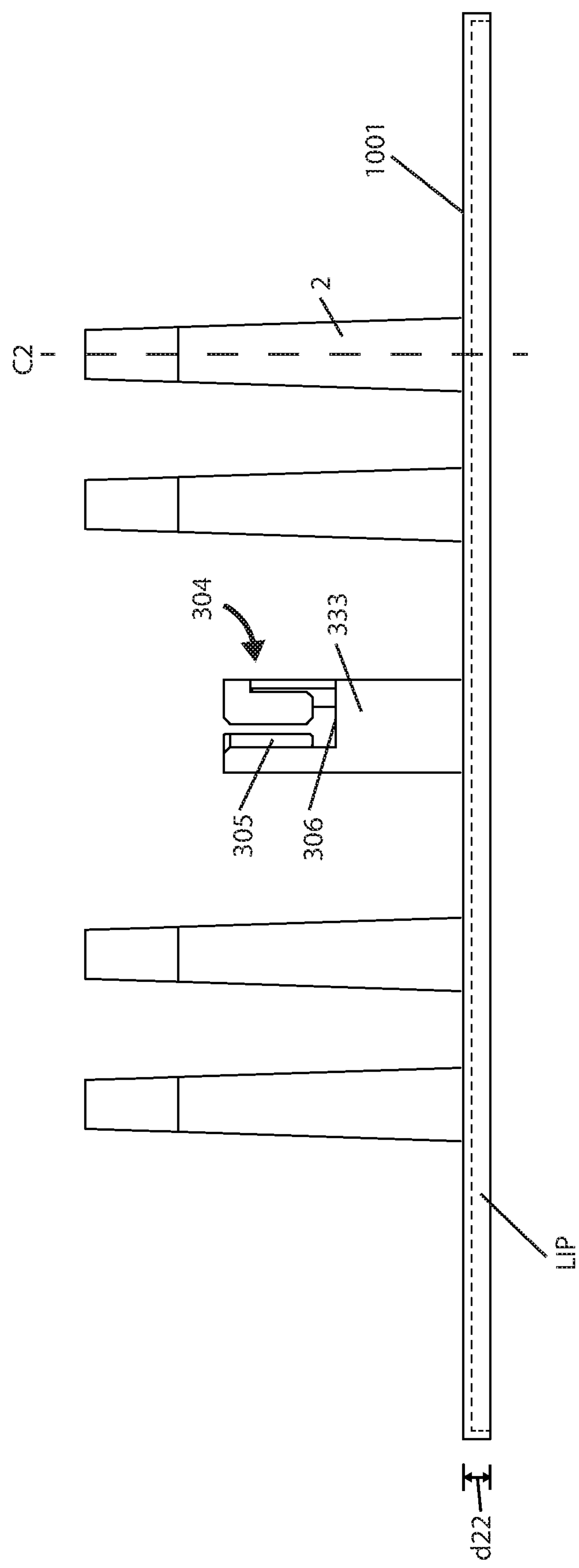
FIG. 12 is a side elevation view of an alternate embodiment.

In FIG. 12 the tray 1001 has no feet. The lip LIP faces down around the periphery to add structural strength.

Nominal dimensions are d45=0.625 inch, d46=0.9 inch, d20=9 inch, d21=1.5 inches, d22=1.5 inches.

Figure 13:
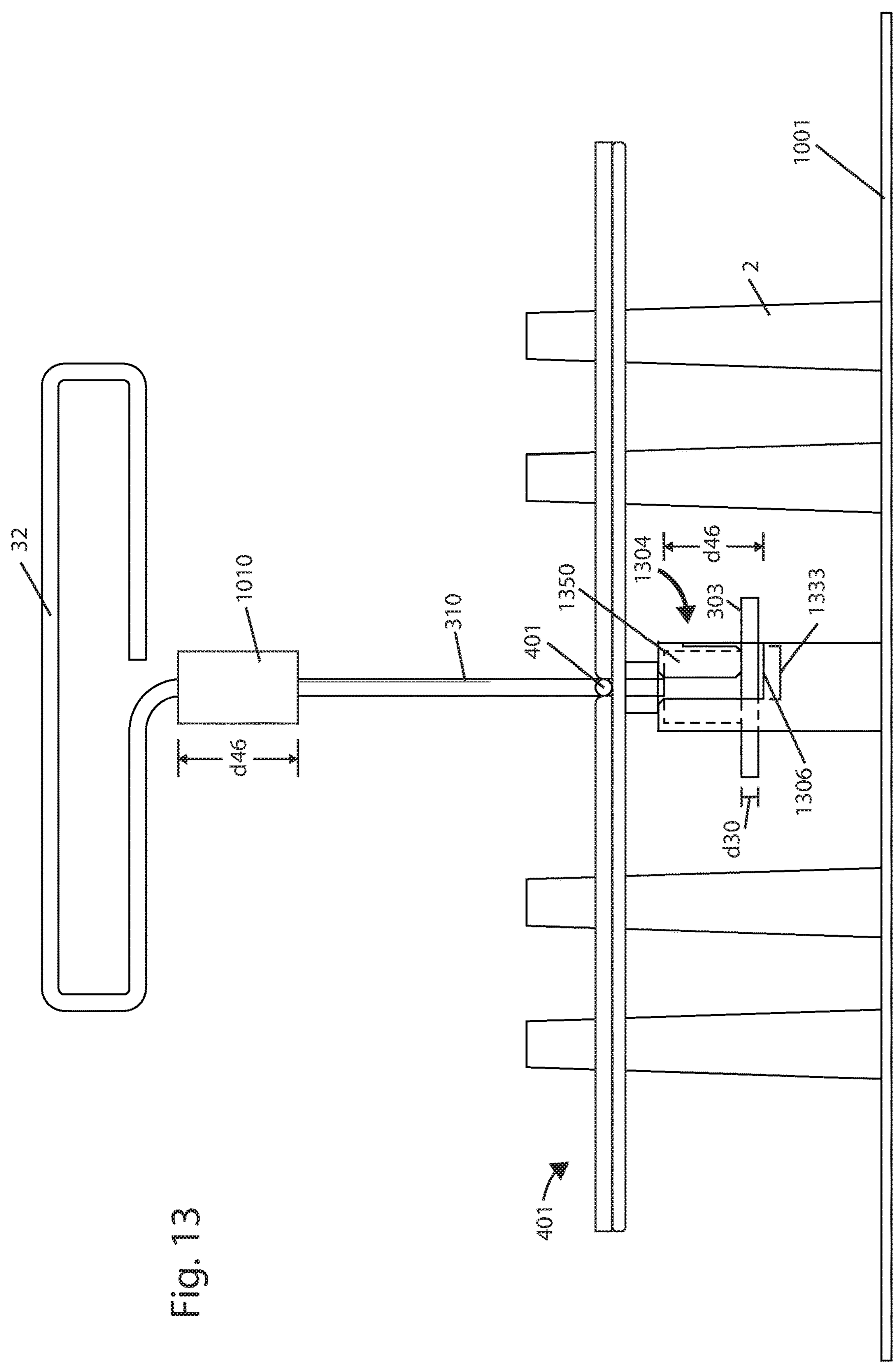
FIG. 13 is a side elevation view of a handle with a lower plug to enable tilting of the pan.

Referring next to FIG. 13 the center post 1333 has been modified relative to center post 333 of FIG. 12 only in that the horizontal slot, formerly 306, is now limited to an 80*c* arc and labeled 1306. This limited engagement motion for arm 303 prevents the radius arm 401 from hitting the post 2. The bottom of the rod 310 has a plug 1350 that fits snugly inside the center post 1333. It is welded to the arm 303. Nominal dimension d30 is 0.17 inch. The top of rod 310 has an optional gripper plug 1010 to assist moving the pan 1001 in the cooking process. The L shaped slot is labeled 1304.

Figure 14:
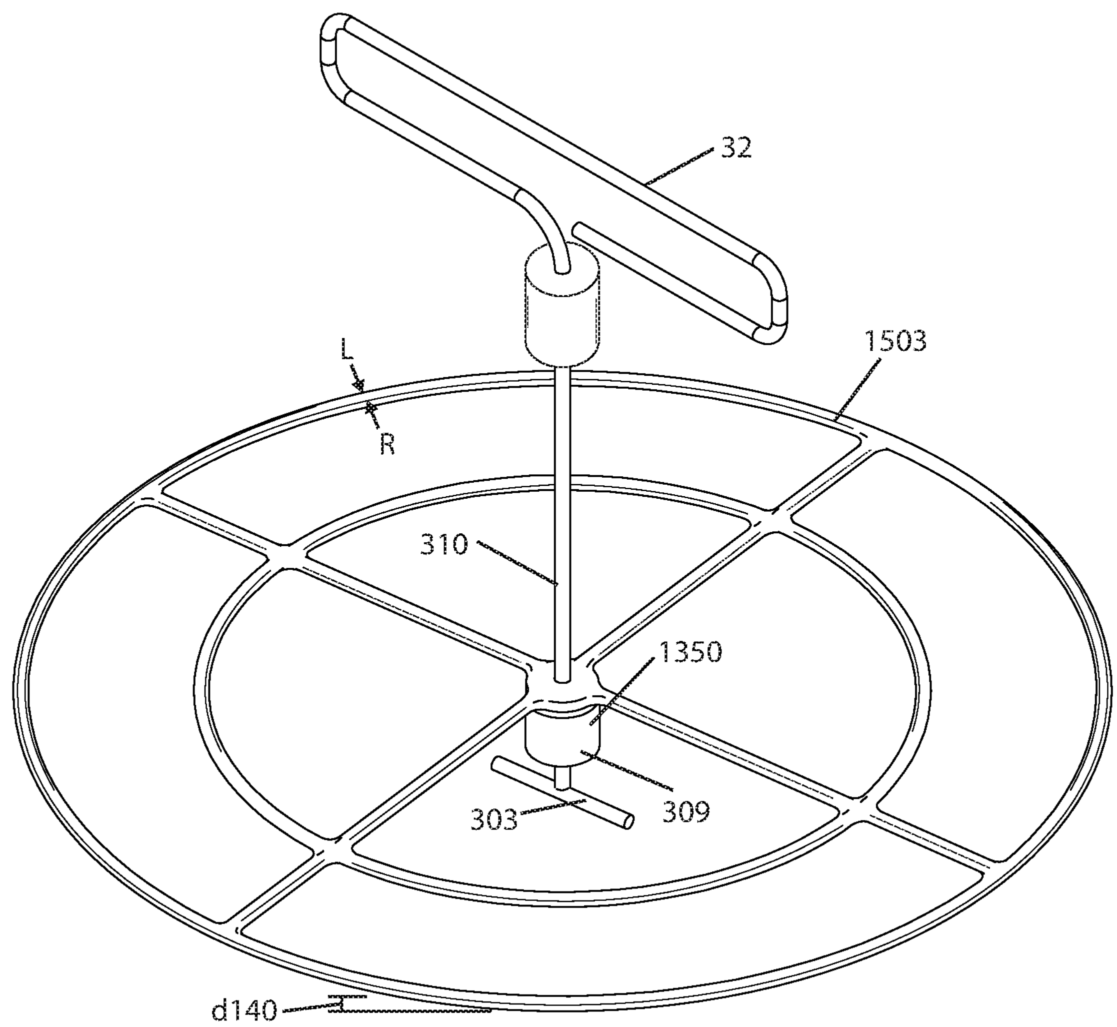
FIG. 14 is a top perspective view of a stamped stainless-steel anti-flotation screen

Referring next to FIG. 14 the anti-flotation screen 1503 is stamped from stainless steel. Nominal dimensions d140=⅜ inch. This construction eliminates 12 welds and 6 bends in screen 300 of FIG. 8. Each leg L has a strengthening raised rib R to bolster the strength of each leg L.

Figure 15:
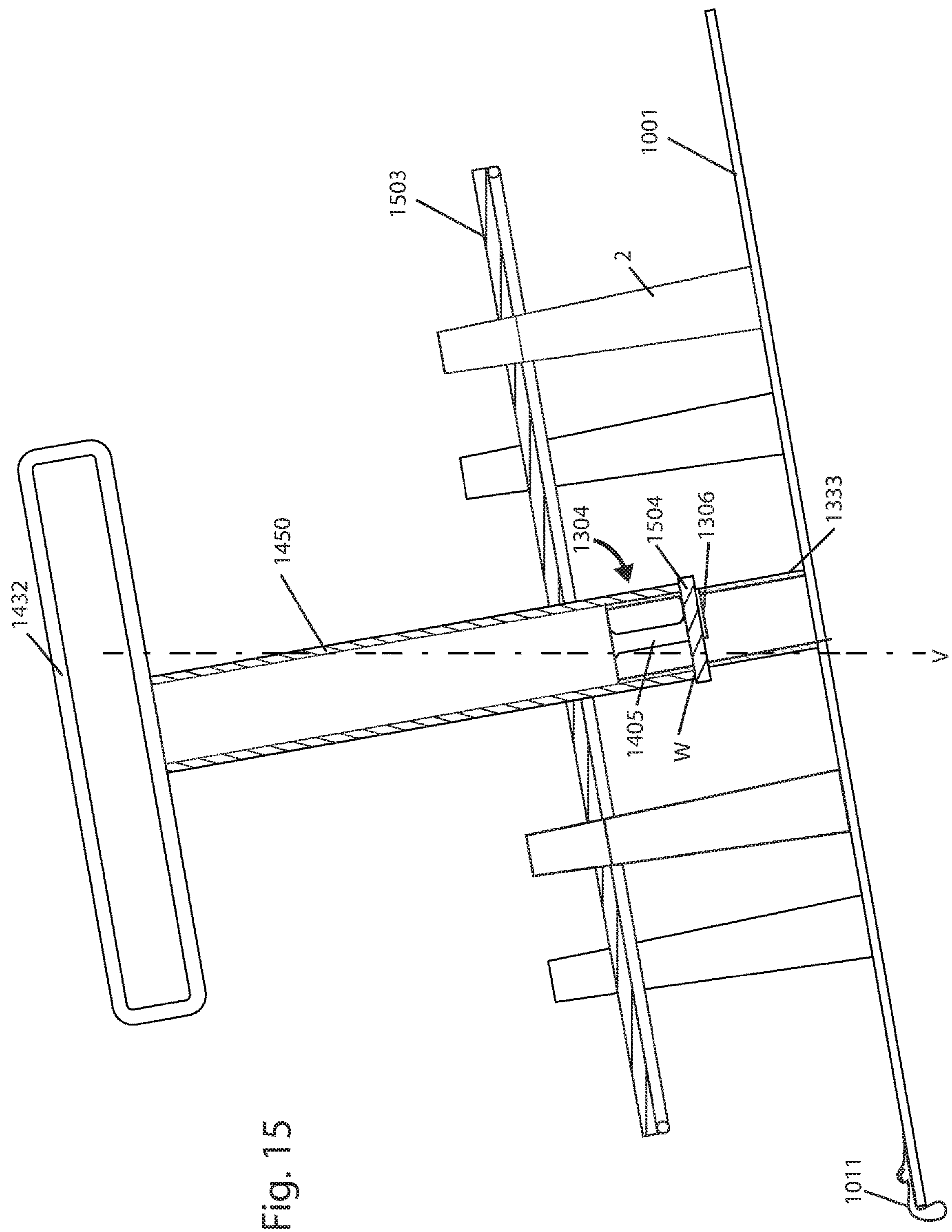
FIG. 15 is a side elevation view of a hollow handle tube like rod used to stabilize the pan during tilting and draining.

Referring next to FIG. 15 the handle 1432 has a hollow cylindrical rod 1450 that slides over the center post 1333. The bottom of rod 1450 is welded at W to an arm 1504. The vertical slot is labeled 1405. In operation the pan 1001 can be tilted as shown from the vertical V to drain the water 1011 off.

Figure 16:
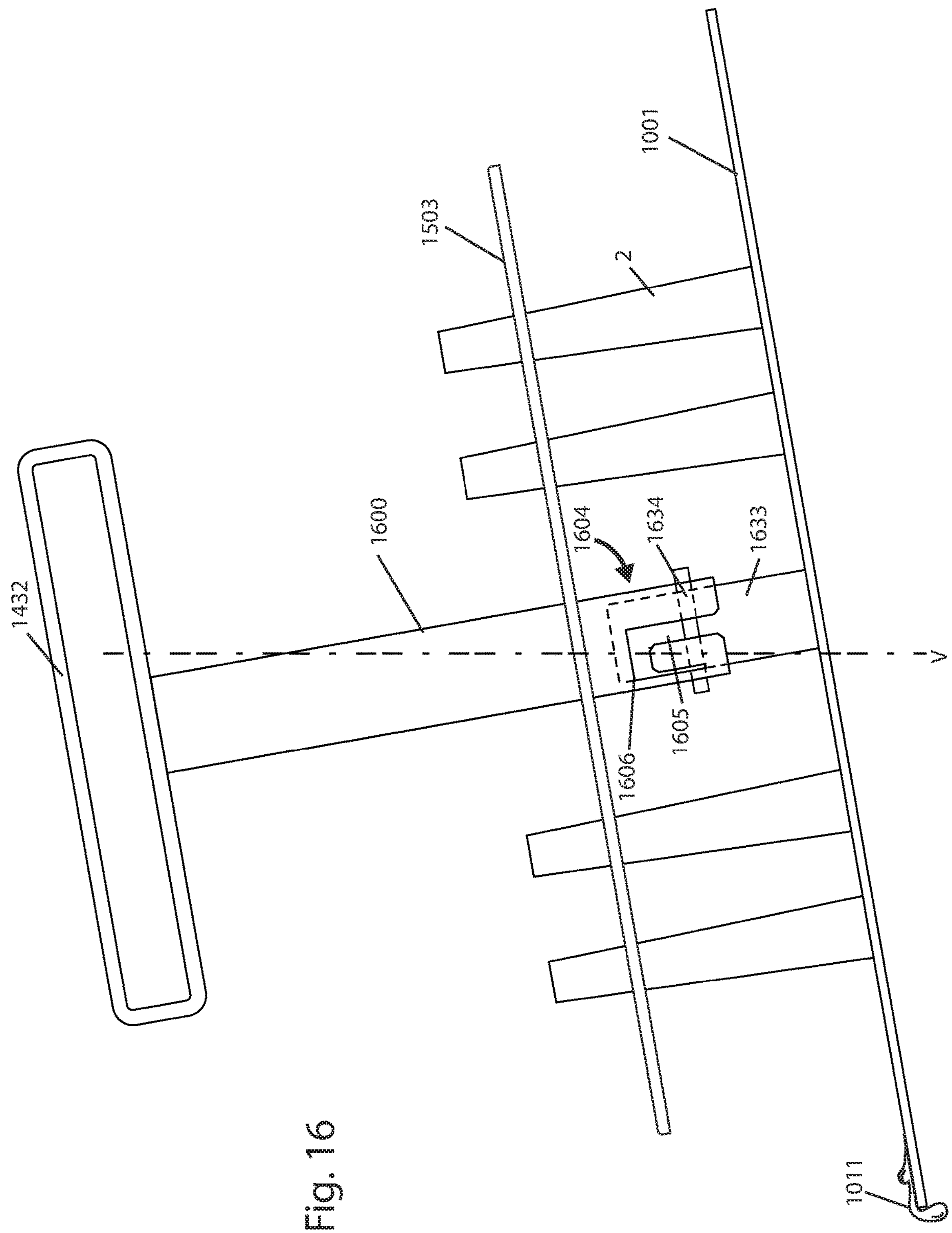
FIG. 16 is a side elevation view of a hollow handle rod with the central post having the anchor rod.

Referring next to FIG. 16 the arm 1634 is welded to the center post 1633. The L shaped slot 1604 has the horizontal leg 1606 and the vertical leg 1605 cut into the bottom of hollow tube 1600. The hollow tube 1600 slide over the center post 1633 to allow the L shaped slot 1604 to engage the arm 1634. The pan 1001 can be tilted from the vertical V.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A water bagel cookware comprising:

a flat, circular base tray having a hollow central receiving cylinder with a pair of L shaped slots;

wherein a vertical slot segment and a bottom horizontal slot segment of each L shaped slot is sized to receive a crossbar on a bottom end of a hollow rod of a handle;

said hollow rod sized to fit over the hollow central receiving cylinder so as to engage the crossbar down the vertical slot segment;

wherein rotating the hollow rod of the handle engages the crossbar in the horizontal slot segments to enable the handle to lift the flat, circular base tray;

a plurality of bagel posts radially spaced from the hollow central receiving cylinder;

said hollow rod of the handle having an integral anti-flotation screen; and wherein the hollow rod of the handle encircles the hollow central receiving cylinder so as to stabilize the base tray to enable the handle to tilt and lift the base tray.

2. The water bagel cookware of claim 1, wherein the flat, circular base tray has a diameter ranging from about 11 inches to about 11.75 inches.

3. The water bagel cookware of claim 1, wherein the plurality of bagel posts consist of four, each radially spaced from the hollow central receiving cylinder, and wherein a top of the flat, circular base tray and the bagel posts are coated with a non-stick compound, and the flat, circular base tray has a plurality of water drain holes.

4. The water bagel cookware of claim 3, wherein the plurality of bagel posts further comprises a hollow construction.

5. The water bagel cookware of claim 4, wherein the plurality of bagel posts further comprises a taper from a wider bottom to a narrower top, said top being open and said bottom having a water exit hole through said flat circular base tray.

6. The water bagel cookware of claim 1, wherein the flat, circular base tray further comprises a downward facing peripheral lip.

7. The water bagel cookware of claim 1, wherein the plurality of bagel posts further comprises a hollow construction.

8. The water bagel cookware of claim 7, wherein the plurality of bagel posts further comprises a taper from a wider bottom to a narrower top, said top being open and said bottom having a water exit hole through said flat circular base tray.

9. A bagel cookware comprising:

a metal bagel tray having a plurality of hollow vertical posts to receive a bagel dough ring;

said hollow vertical posts having a water exit hole through the metal bagel tray;

said metal bagel tray having a central receiving socket receiving a bottom crossbar end of a handle having a hollow central rod;

said hollow central rod having a top gripper and a monolithic anti-flotation arm; and said central receiving socket having a set of vertical slots to receive the bottom crossbar end and having a set of retainer channels to secure the crossbar end in the retainer channels when the handle is twisted thereby enabling the top gripper to lift the metal bagel tray in a lift mode;

wherein a top of the bagel tray and the hollow vertical posts are coated with a non-stick compound;

wherein the bagel tray has water drain holes;

wherein each hollow vertical post is tapered from a wider bottom to a narrower top, said top being open; and said hollow central rod encircling said central receiving socket so as to support said central receiving socket and said metal bagel tray at a tilted orientation during the lift mode.

10. The bagel cookware of claim 9, wherein the monolithic anti-flotation arm further comprises an inner and an outer ring mounted on radial arms extending from the hollow central rod.

11. The bagel cookware of claim 9, wherein the monolithic anti-flotation arm further comprises a plurality of rectangular wires extending from the hollow central rod.

12. The bagel cookware of claim 9, wherein the metal bagel tray has a downward facing peripheral lip.

13. The bagel cookware of claim 9, wherein the set of retainer channels further comprises a horizontal slot extending partially around the central receiving socket at a bottom of each of the set of vertical slots.

14. The bagel cookware of claim 9, wherein the metal bagel tray has a diameter ranging from about 11 inches to about 11.75 inches, and the plurality of vertical posts comprises four posts spaced about 3.5 inches radially from the central receiving socket.

15. A water bagel cookware comprising:

a flat base tray having a hollow central receiving cylinder with a pair of L shaped slots;

wherein a bottom horizontal leg of each slot receives a crossbar on a bottom end of a hollow central rod of a handle;

wherein rotating the hollow central rod of the handle engages the crossbar in the horizontal legs to enable the handle to lift the flat base tray in a lift mode;

a plurality of bagel posts radially spaced from the hollow central receiving cylinder;

said hollow central rod of the handle having a monolithic anti-flotation arm; and wherein the hollow central rod of the handle encircles the hollow central receiving cylinder in the lift mode to support the hollow central receiving cylinder and the flat base tray in a tilted orientation.

16. The bagel cookware of claim 15, wherein the flat base tray and the plurality of bagel posts further comprise a non-stick coating.

17. The bagel cookware of claim 16, wherein the plurality of bagel posts further comprises a hollow construction with an open top and a water exit hole through the flat base tray.

18. The bagel cookware of claim 17, wherein the plurality of bagel posts further comprises a taper from a wider base to a narrower top.

19. The bagel cookware of claim 16, wherein the flat base tray further comprises a water exit hole.

20. The bagel cookware of claim 16, wherein the flat base tray further comprises a downward facing peripheral lip.

* * * * *